United States Patent
Merk et al.

[11] Patent Number: 5,603,476
[45] Date of Patent: Feb. 18, 1997

[54] FILTER HOLDER IN A MOTOR VEHICLE

[75] Inventors: Helmut Merk, Herrenberg; Alfred Jeckel, Rottenberg; Thomas Dietterle, Simmozheim, all of Germany

[73] Assignee: Mercedes-Benz AG, Stuttgart, Germany

[21] Appl. No.: 502,973

[22] Filed: Jul. 14, 1995

[30] Foreign Application Priority Data

Jul. 14, 1994 [DE] Germany .................. 44 24 805.9

[51] Int. Cl.⁶ .................. A47F 5/00; B60H 3/06
[52] U.S. Cl. .................. 248/309.1; 454/158; 55/502; 55/521; 55/497
[58] Field of Search .................. 248/316.7, 27.3; 454/158; 52/198, 302.1; 55/327, 486, 497, 500, 521, 385.3, 502

[56] References Cited

U.S. PATENT DOCUMENTS

| | | | |
|---|---|---|---|
| 3,648,381 | 3/1972 | Fox | 55/500 X |
| 3,712,033 | 1/1973 | Gronholz | 55/502 X |
| 4,048,911 | 9/1977 | Pertersen | 454/158 X |
| 4,242,951 | 1/1981 | Bemiss | 55/385.3 X |
| 5,076,821 | 12/1991 | Bruhnke et al. | 454/158 X |
| 5,158,077 | 10/1992 | Sundstrom | 55/521 X |
| 5,213,596 | 5/1993 | Kume et al. | 55/497 X |
| 5,472,379 | 12/1995 | Andress et al. | 55/502 X |
| 5,540,617 | 7/1996 | Siegel et al. | 454/158 |

FOREIGN PATENT DOCUMENTS

0291072A2  11/1988  European Pat. Off. .............. 454/158

Primary Examiner—Leslie A. Braun
Assistant Examiner—Long D. Phan
Attorney, Agent, or Firm—Evenson McKeown Edwards & Lenahan, PLLC

[57] ABSTRACT

A filter holder assembly is provided for the optional holding in a motor vehicle at a dust filter alone or a dust filter and an absorption filter which is optionally arranged directly downstream of the dust filter. A frame lower part is provided which either holds the dust filter or the absorption filter. When the frame lower part holds the absorption filter, a frame upper part which holds the dust filter is releasably arranged upstream of the frame lower filter.

12 Claims, 2 Drawing Sheets

FILTER HOLDER IN A MOTOR VEHICLE

BACKGROUND AND SUMMARY OF THE INVENTION

The invention relates to a filter holder in a motor vehicle for a dust filter and an absorption filter which is optionally arranged directly downstream of the dust filter.

A filter arrangement of this type, in which the dust filter and the absorption filter are held in a shaft in a manner which allows them to be exchanged, is known from European Patent 0 367 993 A1. In this arrangement, the width of the shaft is adjusted according to the filter size, with the result that it is not possible to economize on the absorption filter and only use the dust filter since the sealing function is then no longer guaranteed.

An object of the invention is to provide a filter holder in which either a dust filter on its own or, in addition, an absorption filter can be used without sealing problems This object is achieved according to preferred embodiments of the invention by providing a filter holder assembly comprising:

a frame lower part having dust filter latching hooks engageable over an edge of a dust filter to hold the dust filter in position when used without an absorption filter, and a frame upper part selectively connectable with the frame lower part by holders such that the frame lower part supports an absorption filter with the latching hooks inactively disposed in grooves in the absorption filter while the frame upper part supports the dust filter, wherein the latching hooks and holders are resiliently supported at the frame lower part to be manually movable to accommodate exchange of said filters.

When an absorption filter is additionally used, provision is made for easy attaching of the frame upper part if the holders are constructed as apertures, in which apertures tongues protruding from the frame upper part engage when the frame upper part is fitted on.

Sealing problems do not occur even when tolerances are widely dispersed if an encircling seal is arranged on the lower side of the absorption filter, which seal, when the frame upper part is fitted on, is pressed with pretension against an associated bearing edge of the frame lower part.

Other objects, advantages and novel features of the present invention will become apparent from the following detailed description of the invention when considered in conjunction with the accompanying drawings.

DETAILED DESCRIPTION OF THE DRAWINGS

Figure 1:
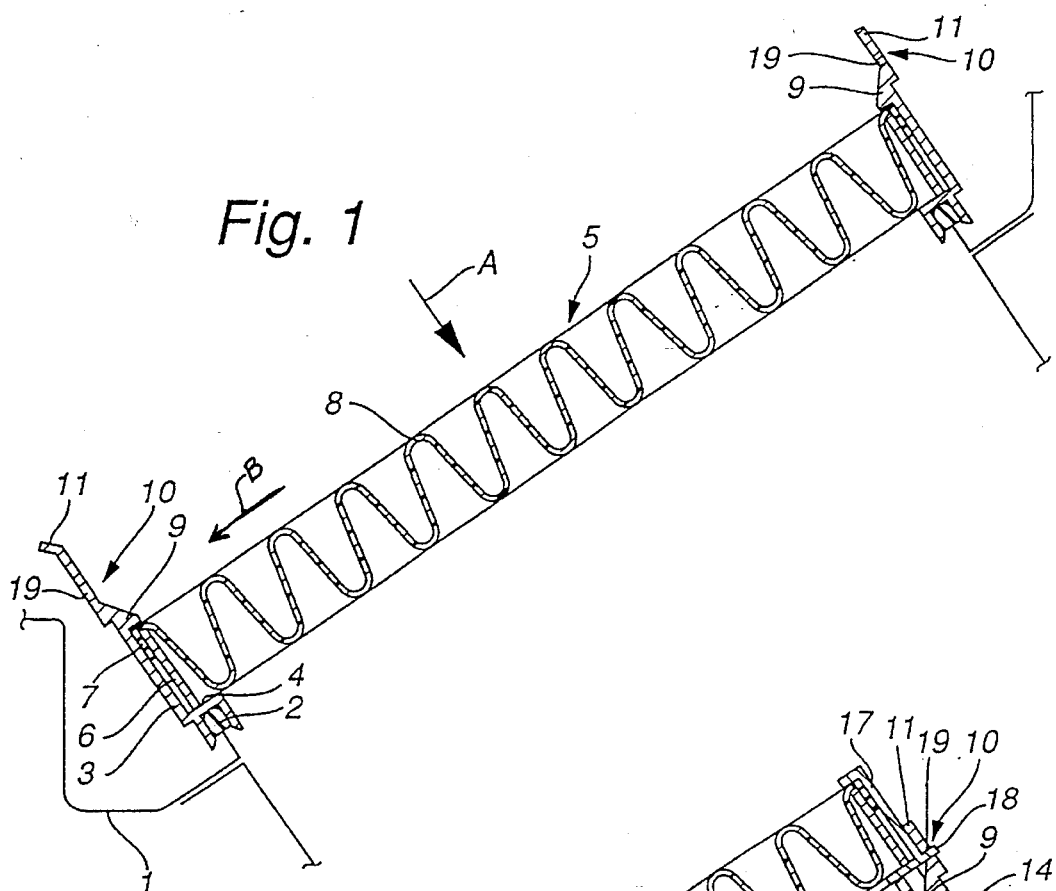
FIG. 1 is a schematic sectional view which shows a frame lower part of a filter holder assembly constructed according to the present invention, the frame lower part being shown placed in an air duct and holding a dust filter.

With the interconnection of a seal 2, a frame lower part 3 is held by an air duct 1, which is merely schematically indicated. The air duct is part of a heating system or air-conditioning system (not shown) in a motor vehicle. On the seal side, the frame lower part 3 has a bearing edge 4 for supporting a filter which, according to FIG. 1, is constructed as a dust filter 5 and comprises a frame 6 with a seal 7 encircling it on the outside, which frame holds a folder filter material 8, for example paper. The dust filter 5 is engaged over by latching hooks 9 which are integrally formed on the frame lower part 3 and adjoining which, with the interconnection of holders 10 described in more detail later, are gripping parts 11. By means of these gripping parts 11, the latching hooks 9 can be manually moved resiliently to the side so that a dust filter 5 which is worn out can easily be exchanged.

In preferred embodiments, the frame parts are rectangular or square and the holders 10 are configured to accommodate manual movement of the gripping part 11 at one side of the filter, while the opposite side of the filter is held by a releasable clip or interengageable parts which can be disengaged by normal lifting or tilting of the filter after movement of the one gripping member 11 at one side. In FIG. 1, gripping parts 11 are illustrated at the opposite sides, either of which can be manually gripped and moved to accommodate a filter exchange. Embodiments are contemplated with a gripping part 11 at only one side, the opposite side having a releasable clip or set of interengageable parts which releases the filter upon a manual lifting or tilting of same. Embodiments are also contemplated with a pair of spaced gripping parts 11 disposed along one or both opposite sides of the frame parts.

The above-described arrangement with a dust filter 5 constitutes standard equipment, there also being the possibility to provide the dust filter 5 with an activated-carbon coating which, however, due to its relatively small surface is absorptive only to a limited extent.

Figure 2:
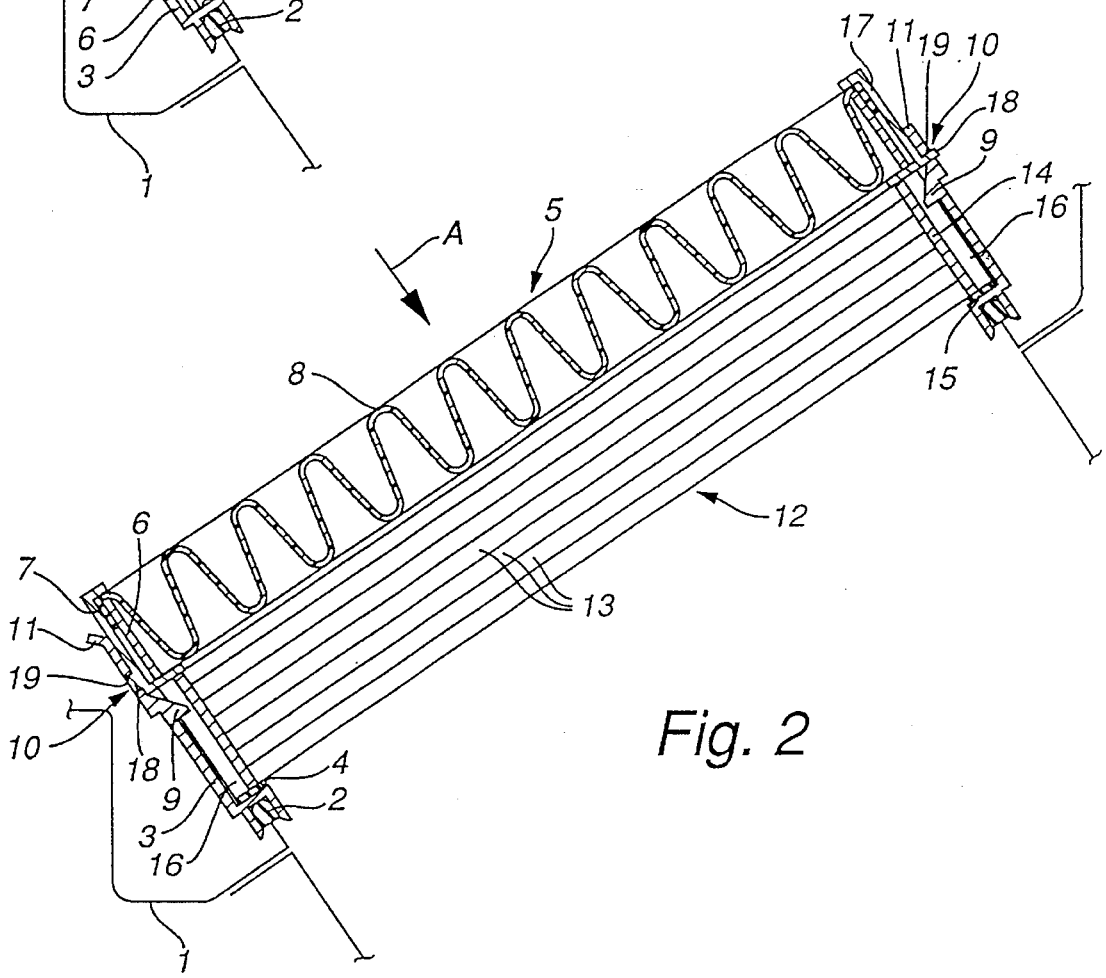
FIG. 2 is a view similar to FIG. 1 which shows the filter holder assembly in position holding both a dust filter and an absorption filter, with the absorption filter held by the frame lower part, which also holds a frame upper holding the dust filter.
Figure 3:
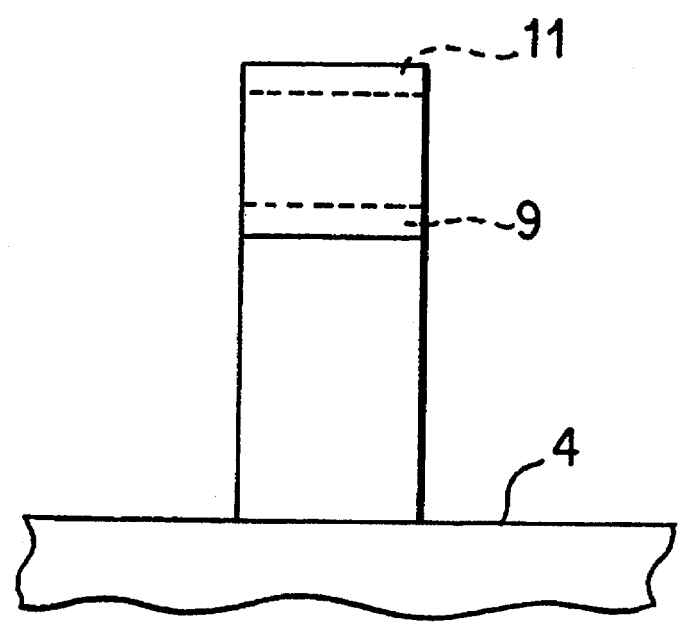
FIG. 3 is a partial schematic view taken in the direction of arrow B of FIG. 1.

If, in addition, an absorption filter 12, in particular an activated-carbon filter, is to be used, the arrangement is supplemented in the manner illustrated in FIG. 2. As can be seen, the frame lower part 3 then serves to support he absorption filter 12, the frame 14 of which, which holds a plurality of mats 13 made of skeleton foam coated with activated carbon, is provided towards the bearing edge 4 of the frame lower part 3 with an encircling seal 15. Provided on the outside of the frame 14 are grooves 16 which serve to accommodate the latching hooks 9 which do not have a function in this arrangement with both filters.

Arranged upstream of the frame lower part 3, in the direction of flow indicated by an arrow A, is a frame upper part 17 which holds the dust filter 5 and engages by means of tongues 18 in apertures 19 in holders 10. In this arrangement, the dimensions of the frame 14 and seal 15 are selected in such a manner that even when relatively large tolerances occur, on inserting the tongues 18 into the window 19 the absorption filter 12 is pressed by means of the frame upper part 17 in a sealing manner against the bearing edge 4 of the frame lower part.

If a worn out dust filter 5 is to be changed the gripping parts 11, which can be operated easily without a tool and are assigned to the left edge of the drawing, are moved to the side and after its tongues 18 have been withdrawn from the associated apertures 19 the frame upper part 17 is removed together with the dust filter 5. With the frame upper part 17 removed the absorption filter 12 can also be reached easily and may, if required by changed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filter holder assembly for holding a dust filter and an optionally provided absorption filter in a motor vehicle air duct, said filter holder assembly comprising:

a frame lower part having dust filter latching hooks engageable over an edge of a dust filter to hold the dust filter in position when used without an absorption filter, and a frame upper part selectively connectable with the frame lower part by holders such that the frame lower part supports an absorption filter with the latching hooks inactively disposed in grooves in the absorption filter while the frame upper part supports the dust filters, wherein the latching hooks and holders are resiliently supported at the frame lower part to be manually movable to accommodate exchange of said filters.

2. A filter holder assembly according to claim 1, wherein said frame lower and upper parts are configured to hold both said filters with said absorption filter disposed directly downstream of the dust filter.

3. A filter holder assembly according to claim 1, wherein said latching hooks and holders are disposed on respective common resilient members forming part of the lower frame part.

4. A filter holder assembly according to claim 1, wherein the holders are constructed as apertures in the lower frame part in which tongues protruding from the frame upper part engage, when the frame upper part is fitted on the frame lower part to hold both said filters.

5. A filter holder assembly according to claim 2, wherein the holders are constructed as apertures in the lower frame part in which tongues protruding from the frame upper part engage, when the frame upper part is fitted on the frame lower part to hold both said filters.

6. A filter holder assembly according to claim 3, wherein the holders are constructed as apertures in the lower frame part in which tongues protruding from the frame upper part engage, when the frame upper part is fitted on the frame lower part to hold both said filters.

7. A filter holder assembly according to claim 1, wherein an encircling seal is arranged on a lower side of the absorption filter, which seal is pressed with pretension against an associated bearing edge of the frame lower part when the frame upper part is fitted on the frame lower part.

8. A filter holder assembly according to claim 2, wherein an encircling seal is arranged on a lower side of the absorption filter, which seal is pressed with pretension against an associated bearing edge of the frame lower part when the frame upper part is fitted on the frame lower part.

9. A filter holder assembly according to claim 3, wherein an encircling seal is arranged on a lower side of the absorption filter, which seal is pressed with pretension against an associated bearing edge of the frame lower part when the frame upper part is fitted on the frame lower part.

10. A filter holder assembly according to claim 4, wherein an encircling seal is arranged on a lower side of the absorption filter, which seal is pressed with pretension against an associated bearing edge of the frame lower part when the frame upper part is fitted on the frame lower part.

11. A filter holder assembly according to claim 5, wherein an encircling seal is arranged on a lower side of the absorption filter, which seal is pressed with pretension against an associated bearing edge of the frame lower part when the frame upper part is fitted on the frame lower part.

12. A filter holder assembly according to claim 6, wherein an encircling seal is arranged on a lower side of the absorption filter, which seal is pressed with pretension against an associated bearing edge of the frame lower part when the frame upper part is fitted on the frame lower part.

* * * * *